(12) United States Patent
Wu et al.

(10) Patent No.: US 10,570,262 B2
(45) Date of Patent: Feb. 25, 2020

(54) GELATIN BASE EDIBLE FILM AND PREPARATION METHOD THEREOF

(71) Applicant: Ningxia Jinbole Food Technology Co., Ltd., Wuzhong, Ningxia (CN)

(72) Inventors: Yuzhu Wu, Ningxia (CN); Zheng Li, Tianjin (CN); Yimin Lu, Ningxia (CN)

(73) Assignee: NINGXIA JINBOLE FOOD TECHNOLOGY CO., LTD., Wuzhong-Ningxia (CN)

( * ) Notice: Subject to any disclaimer, the term of this patent is extended or adjusted under 35 U.S.C. 154(b) by 0 days.

(21) Appl. No.: 16/393,717

(22) Filed: Apr. 24, 2019

(65) Prior Publication Data

US 2019/0248971 A1    Aug. 15, 2019

(30) Foreign Application Priority Data

Jun. 7, 2018   (CN) .................. 2018 1 05814536

(51) Int. Cl.

| C08J 5/00 | (2006.01) |
|---|---|
| C08J 5/18 | (2006.01) |
| C08J 3/075 | (2006.01) |
| C08J 3/24 | (2006.01) |
| C08L 89/00 | (2006.01) |

(52) U.S. Cl.
CPC .............. *C08J 5/18* (2013.01); *C08J 3/075* (2013.01); *C08J 3/246* (2013.01); *C08L 89/00* (2013.01); *C08J 2389/00* (2013.01); *C08J 2389/04* (2013.01); *C08J 2401/02* (2013.01); *C08J 2477/04* (2013.01); *C08L 2203/16* (2013.01); *C08L 2312/00* (2013.01)

(58) Field of Classification Search
CPC ...... C08J 5/00; C08J 3/00; C08K 5/00; C08L 89/00
See application file for complete search history.

(56) References Cited

U.S. PATENT DOCUMENTS

| 2010/0240724 A1* | 9/2010 | Chang ................. | A61K 9/0056 514/394 |
|---|---|---|---|
| 2011/0244048 A1* | 10/2011 | Amiji .................. | A61K 9/1273 424/493 |

* cited by examiner

*Primary Examiner* — David P Turocy
*Assistant Examiner* — Mohammad Mayy

(57) ABSTRACT

The present disclosure provides an edible gelatin base film and preparation method thereof, relating to material fields. The preparation method can improve the mechanical property of the film. The films prepared by the method have antibacterial properties, low-temperature stability and high-temperature dissolution, environmental-friendly components. The method includes the following steps: a) preparing gel nanoparticles; b) preparing bacterial cellulose nanoparticles; c) preparing the gelatin base film: mixing pullulan, glycerin, nisin, antibacterial peptide, the gel nanoparticles obtained from step a) and the bacterial cellulose nanoparticles obtained from step b), ultrasonically degassing, then being subjected to coating and drying to obtain the gelatin base film. The preparation method is used to prepare an edible gelatin base film.

9 Claims, 1 Drawing Sheet

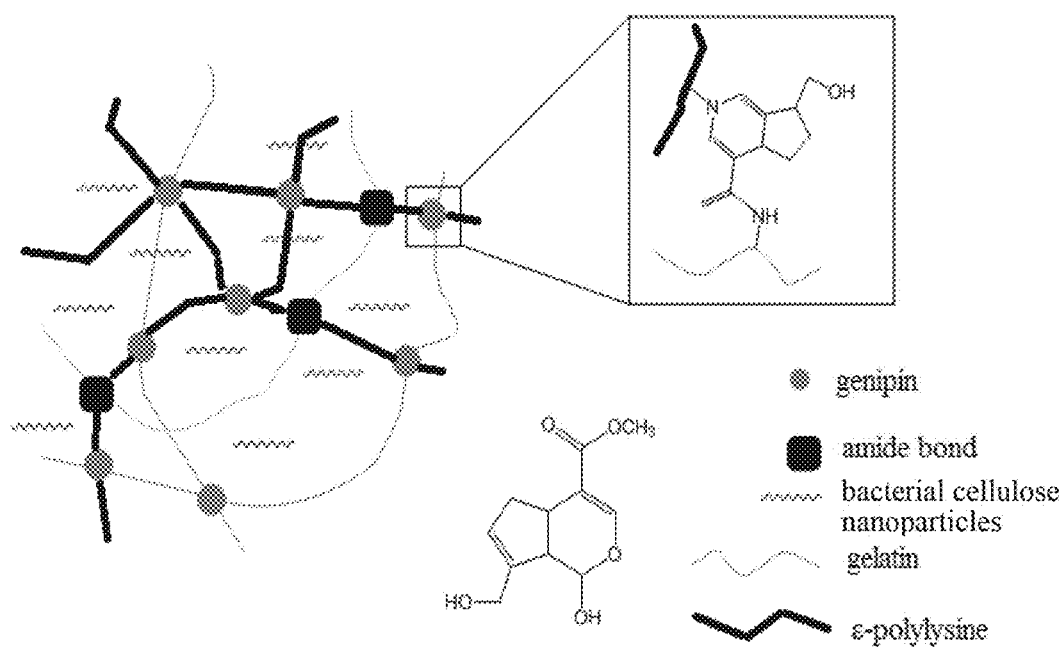

GELATIN BASE EDIBLE FILM AND PREPARATION METHOD THEREOF

CROSS REFERENCE TO RELATED APPLICATION

This application claims priority of Chinese Application No. 2018105814536 filed on 2018 Jun. 7 and entitled "gelatin base edible film and preparation method thereof".

TECHNICAL FIELD

The present disclosure relates to the field of materials, especially relates to edible films and specially relates to a gelatin base edible film and preparation method thereof.

BACKGROUND

Nowadays, the "white pollution" caused by petrochemical industry is growing an increasingly serious problem. It has become a research hotspot in the field of material packaging to develop renewable and degradable edible film materials of natural biopolymer with environment-friendly to replace traditional plastic packaging so as to reduce white pollution. The edible film is a film with certain properties formed by intramolecular and intermolecular chemical bonds using natural macromolecules such as polysaccharides and proteins as matrix. According to the matrix, it can be classified into starch, protein, polysaccharide, fat and composite. An edible film may have many advantages such as light weight, hygienic, non-toxic, tasteless and so on.

In the prior art, the structure and properties of edible films vary greatly due to different components and processing technics. In the prior art, the comprehensive performance of the film is relatively weak, only a certain performance such as mechanical strength is high, other aspects such as antibacterial property are weak, which fails to meet practical needs. Therefore, it is necessary to design an edible film with high comprehensive performance and practical value.

SUMMARY OF THE INVENTION

The present disclosure proposes a gelatin base edible film and preparation method thereof. The prepared film has good mechanical property, antibacterial property and practical values of low-temperature stability and high-temperature dissolution.

A preparation method of a gelatin base edible film, including the following steps:

a) preparing gel nanoparticles, specifically comprising:

a1) dissolving gelatin in water to obtain a gelatin solution, and adding a ε-polylysine solution into the gelatin solution to react and obtain a first solution;

a2) adding a genipin solution into the first solution obtained in step a1) to react and obtain a second solution;

a3) adding 1-(3-dimethylaminopropyl)-3-ethylcarbodiimide hydrochloride (EDC) into the second solution obtained in step a2) to mix, then reacting in an ice bath and then reacting at room temperature to obtain a double-network polymer;

a4) removing impurities such as excess EDC and genipin from the double-network polymer obtained in step a3), then pulverizing the double-network polymer to obtain gel nanoparticles;

b) preparing bacterial cellulose nanoparticles grinding a bacterial cellulose into bacterial cellulose nanoparticles under the condition of liquid nitrogen freezing;

c) preparing the gelatin base edible film mixing pullulan, glycerin, nisin, antibacterial peptide, the gel nanoparticles obtained in step a) and the bacterial cellulose nanoparticles obtained in step b), ultrasonically degassing, then the resulted system being subjected to coating and drying to form a film to obtain the gelatin base edible film.

Further, in step a1), the mass ratio of the ε-polylysine solution to the gelatin solution is 2-50:1000; in step a2), the genipin solution is added into the first solution obtained in step a1) to make the concentration of genipin in the reaction system is 0.1-5 mmol/L; in step a3), the EDC is added in a molar ratio of EDC to ε-polylysine of 1:1-5.

Further, in step a1), the mass fraction of the gelatin solution is 1-6%; the mass fraction of the ε-polylysine solution is 1-5%.

Further, in step a2), the concentration of the genipin solution is 0.001-1 mol/L; the temperature of the reaction is 10-40° C., and the time of the reaction is 4-15 h.

Further, in step a3), the time for the reaction in the ice bath is 0.5-2 h; the time for the reaction at room temperature is 2-24 h.

Further, in step a4), excess EDC and genipin are removed by dialysis.

Further, in step a4), the diameter of the gel nanoparticle is 0.5-1 um; in step b), the diameter of the bacterial cellulose nanoparticle is 0-500 nm.

Further, in step c), the mass ratio among the gel nanoparticles, the bacterial cellulose nanoparticles, pullulan, glycerin, nisin and the antibacterial peptide is 800-1000:50-100:5-10:1-5:0.05-0.2:0.05-0.2.

Further, in step c), the time of ultrasonically degassing is 1-2 h; the film temperature of coating is 5-10° C.; drying is carried out under the condition of a temperature of 1-4° C. and a wind speed of 10-50 L/min.

The present disclosure also provides an edible gelatin base film prepared by anyone of the above preparation methods.

Compared with the prior art, the advantages of the edible gelatin base film provided by the present disclosure are as follows:

(1) The gelatin base edible film proposed by the present disclosure is subjected to double-network crosslinking by genipin and 1-(3-dimethylaminopropyl)-3-ethylcarbodiimide hydrochloride (EDC) and filling with nano-scale three-dimensional bacterial celluloses, that is, a rigid structure is formed in the core layer of the film through constructing a double-network structure filled with nano-scale bacterial celluloses, forming a strong three-dimensional support structure layer, and significantly improving the structure and increasing the mechanical strength of the film.

(2) The gelatin base film proposed by the present disclosure is subjected to a low temperature and variable temperature processing technic, then the conformational transformation rate from random coil to triple helix in the gelatin molecular chain is increased, and the triple helix structure formed in the solution is locked in the film matrix, thereby improving the film structure and mechanical strength.

(3) The gelatin base film proposed by the present disclosure is stable at low temperature (below 50° C.) and soluble at high temperature (above 50° C.) due to the specific components and structure of the film, which is suitable for seasoning package of hot water preparation, such as instant noodle seasoning package, salt bag, sugar bag, tea bag and so on.

(4) The gelatin base film proposed by the present disclosure has certain antibacterial property due to the addition of ε-polylysine, which performs excellent antibacterial properties against Gram-negative. *Escherichia coli*, Gram-positive and *Staphylococcus aureus*.

(5) The components of the gelatin base film proposed by the present disclosure have rich nutrients, which can supplement amino acid, cellulose, protein, dietary fiber and other nutrients in an appropriate amount. And the film is of high environmental protection value with no environmental pollution.

BRIEF DESCRIPTION OF FIGURES

The accompanying drawings as a part of the present disclosure are included to provide further understanding, and the exemplary embodiments and the descriptions thereof are used to explain the present disclosure, which do not constitute any improper limitations to the present disclosure. In the drawings:

FIG. 1 is a structural schematic of the gelatin base film according to the embodiments of the present disclosure.

DETAILED DESCRIPTION

It should be noted that the embodiments and the features in the embodiments of the present disclosure can be combined with each other without conflict.

The embodiments of the present disclosure provide a preparation method of edible gelatin base films, using gelatin as the matrix, performing double-network crosslinking by genipin and 1-(3-dimethylaminopropyl)-3-ethylcarbodiimide hydrochloride (EDC), and then filling nano-scale three-dimensional bacterial cellulose particles. The gelatin base film prepared by the method has advantages of high mechanical stability, rich nutrient in components, being stable at low temperature, being soluble at high temperature, and certain antibacterial property.

At present, mechanical property, water solubility at different temperatures, and antibacterial property are important indicators for the comprehensive performance evaluation in the field of edible film. However, in the prior art, existing films cannot have several advantages of high mechanical property, being stable at low temperature, being soluble at high temperature and certain antibacterial property at the same time. It tends to be insoluble or poor in antibacterial property when the mechanical property is high. The present disclosure contemplates constructing an edible film stable at low temperature, soluble at high temperature, with high mechanical property and antibacterial property, has great practical values and can be used for seasoning package of hot water preparation, such as instant noodle seasoning package, salt bag, sugar bag, tea bag and so on.

The preparation method of the embodiments uses gelatin as the matrix to design a new edible film. As a natural colloidal macromolecular material, gelatin with heterogeneous protein is a mixture of α-chain, β-chain and γ-chain, the typical structure of a gelatin molecule is Ala-Gly-Pro-Arg-Gy-Glu-4HypGly-Pro-. Gelatin has its own unique film-forming property, biodegradability and eligibility, as well as low cost.

FIG. 1 is a structural schematic of the gelatin base film according to the embodiments of the present disclosure, which schematically shows a double-network crosslinking structure filled with nano-scale three-dimensional bacterial celluloses. As shown in FIG. 1, the gelatin base film prepared by the method of the present disclosure is subjected to double-network crosslinking by genipin and 1-(3-dimethylaminopropyl)-3-ethylcarbodiimide hydrochloride (EDC), wherein, the genipin used as a cross-linking agent can link the hydroxyl group of gelatin and the amino group of ε-polylysine, and EDC can link the carboxyl group of gelatin and the amino group of ε-polylysine by activating, producing an amide bond for crosslinking and forming the double-network. Moreover, nano-scale three-dimensional bacterial celluloses are filled to support the double-network crosslinking structure. That is, a rigid structure is formed in the core layer of the film through constructing a double-network structure filled with nano-scale bacterial celluloses, forming a strong three-dimensional support structure layer, and significantly improving the structure and increasing the mechanical strength of the film, meanwhile, the addition of ε-polylysine also increases the antibacterial property.

In the preparation method of the embodiments of the present disclosure, the components of the edible film including pullulan, glycerin, nisin, antimicrobial peptides, gel nanoparticles, bacterial cellulose nanoparticles, etc. work together by the special processing technic of the present disclosure to further improve the structure and property of the film.

In the preparation method of the embodiments of the present disclosure, during the processing technic, the gelatin base film is subjected to low temperature and variable temperature, which can increases the conformational transformation rate from random coil to triple helix in the gelatin molecular chain and lock the triple helix structure formed in the solution in the film matrix, thereby improving the film structure and mechanical strength.

In the preparation method of the embodiments of the present disclosure, the gelatin base film is stable at low temperature and soluble at high temperature due to the specific components and structure of the film. It is stable below 50° C., which is suitable for transportation, storage and other environments. It can dissolve quickly above 50° C., which is suitable for seasoning package of hot water preparation, such as instant noodle seasoning package, salt bag, sugar bag, tea bag and so on.

In the preparation method of the embodiments of the present disclosure, ε-polylysine is a micromolecule polymer produced by polymerization of lysine, and has broad-spectrum antibacterial property because its molecular surface contains a large amount of positively charged amino groups, and the edible film based on that performs excellent antibacterial properties against Gram-negative, *Escherichia coli*, Gram-positive and *Staphylococcus aureus*.

The preparation method of the gelatin base film provided by the embodiments of the present disclosure includes the following steps:

a) preparing gel nanoparticles, specifically comprising:

a1) dissolving gelatin in water to obtain a gelatin solution, and adding a ε-polylysine solution into the gelatin solution to react and obtain a first solution;

a2) adding genipin solution to the first solution obtained in step a1) to react and obtain a second solution;

a3) adding 1-(3-dimethylaminopropyl)-3-ethylcarbodiimide hydrochloride (EDC) into the second solution obtained in step a2) to mix, then reacting in an ice bath and then reacting at room temperature to obtain double-network polymer;

a4) removing impurities from the double-network polymer obtained in step a3), such as excess EDC and genipin, then pulverizing the double-network polymer to obtain the gel nanoparticles;

b) preparing bacterial cellulose nanoparticles grinding a bacterial cellulose into bacterial cellulose nanoparticles under the condition of liquid nitrogen freezing;

c) preparing the gelatin base film mixing pullulan, glycerin, nisin, antibacterial peptide, the gel nanoparticles obtained in step a) and the bacterial cellulose nanoparticles obtained in step b), ultrasonically degassing, then the resulted system being subjected to coating and drying to form a film to obtain the gelatin base film.

The gelatin base film proposed by the present disclosure is subjected to double-network crosslinking by genipin and 1-(3-dimethylaminopropyl)-3-ethylcarbodiimide hydrochloride (EDC), and filling with nano-scale three-dimensional bacterial celluloses, that is, a rigid structure is formed in the core layer of the film through constructing a double-network structure filled with nano-scale bacterial celluloses, forming a strong three-dimensional support structure layer, and significantly improving the structure and increasing the mechanical strength of the film.

The individual steps will be further elucidated and all embodiments of the individual processes as described are hereby explicitly combined.

In step a1), the mass fraction of the gelatin solution is 1-6%, specifically, it can be 1%, 2%, 3%, 6%, etc. For example, gelatin can be dissolved in water to provide a gelatin solution with a mass fraction of 2%.

In step a1), the ε-polylysine solution can be obtained by dissolving C-polylysine in water. The mass fraction of the ε-polylysine solution can be 1-5%; specifically, it can be 1%, 2%, 3%, 5%, etc.

In step a1), the mass ratio of the ε-polylysine solution to the gelatin solution can be 2-50:1000; specifically, it can be 2:1000, 5:1000, 20:1000, 30:1000, 50:1000, etc.

In step a2), the concentration of the genipin solution is 0.001-1 mol/L; it can be 0.001 mol/L, 0.01-1 mol/L, 0.1-1 mol/L or 1 mol/L.

In step a2), the genipin solution is added into the first solution obtained in the step a1) to make the concentration of genipin in the reaction system is 0.1-5 mmol/L; specifically, it can be 0.1 mmol/L, 0.5 mmol/L, 1 mmol/L, 3 mmol/L, 5 mmol/L, etc.

In step a2), the genipin solution is added into the first solution obtained in the step a1) to react, and the temperature of the reaction is 10-40° C., the time of the reaction is 4-15 h.

In step a3), EDC is added in a molar ratio of ε-polylysine to EDC of 1-5:1. It can be 1:1, 2:1, 3:1, 5:1, etc.

In step a3), after adding EDC into the second solution obtained in step a2), the resulted system is subjected to a variable temperature reaction, comprising a stage of an ice bath reaction and a stage of a room temperature reaction. The ice bath reaction is first carried out (the reaction system is subjected to a chemical reaction at 0° C. in an ice bath), and then the room temperature reaction is carried out (the reaction system is subjected to a chemical reaction at room temperature of 20-25° C.). Wherein, the time of the ice bath reaction is 0.5-2 h; specifically, it can be 0.5 h, 1 h, 1.5 h, 2 h. The time of the room temperature reaction is 2-24 h; specifically, it can be 2 h, 5 h, 10 h, 20 h, 24 h.

In step a4), removing impurities from the double-network polymer obtained in the step a3), such as excess EDC and genipin. Preferable, excess EDC and genipin can be removed by dialysis.

In step a4), removing excess EDC and genipin, then pulverizing the double-network polymer with a homogenizer to obtain the gel nanoparticles. The diameter of the gel nanoparticle is 0.5-1 um.

The preparation method of the embodiments uses gelatin as the matrix to design an edible film. Gelatin has its own unique film-forming property, biodegradability and eligibility, as well as low cost.

In step b), grinding a bacterial cellulose into bacterial cellulose nanoparticles under the condition of liquid nitrogen freezing.

Wherein, the diameter of the bacterial cellulose nanoparticle is 0-500 nm; specifically, it can be 0-200 nm, 10-300 nm, 20-100 nm, 50-300 nm or 10-500 nm.

In the present disclosure, under the condition of liquid nitrogen freezing (−197° C.), grinding bacterial cellulose into bacterial cellulose nanoparticles, and filling the double-network polymer with the nano-dimensional three-dimensional bacterial cellulose, which can obviously improve the film structure, increase mechanical property of the film.

In step c), mixing pullulan, glycerin, nisin, antibacterial peptide, the gel nanoparticles and the bacterial cellulose nanoparticles, ultrasonically degassing, then the resulted system being subjected to coating and drying to form a film to obtain the gelatin base edible film.

Wherein, the mass ratio among the gel nanoparticles, the bacterial cellulose nanoparticles, pullulan, glycerin, nisin and antibacterial peptide is 800-1000: 50-100:5-10:1-5: 0.05-0.2:0.05-0.2; specifically, it can be 900:80:8:4:0.1:0.1.

In the present disclosure, the gel nanoparticles obtained by a special process of gelatin and ε-polylysine are combined with bacterial cellulose nanoparticles frozen by liquid nitrogen, the antibacterial nisin, the pullulan, the glycerin, the antibacterial peptide to work together, and they are made under specific processing technic so as to produce an edible film with special properties.

In step c), the time of ultrasonically degassing is 1-2 h.

In step c), the film temperature of coating is 5-10° C.

In step c), drying is carried out under the condition of a temperature of 1-4° C. and a wind speed of 10-50 L/min.

In step c), after mixing the components and ultrasonically degassing, the resulted system being subjected to coating and drying to form a film, then the film forming process is completed and a gelatin base film is obtained. After ultrasonically degassing, a gelatin base film is obtained by a low temperature and variable temperature processing technic. For example, the condition of the film forming process can specifically be: coating film: temperature 5° C., drying: temperature 1° C., wind speed 50 L/min; coating film: temperature 8° C., drying: temperature 2° C., wind speed 20 L/min; coating film: temperature 10° C. drying: temperature 4° C., wind speed 10 L/min, etc.

Preferably, in step c), the film temperature of coating is 5-10° C.; drying is carried out under the condition of a temperature of 1-4° C. By a low temperature and variable temperature processing technic, the conformational transformation rate from random coil to triple helix in the gelatin molecular chain can be increased and the triple helix structure formed in the solution can be locked in the film matrix, thereby improving the mechanical strength.

In other embodiments of the present disclosure, an edible gelatin base film prepared by the above method is provided.

In an alternative embodiment, the gelatin base edible film comprises: gelatin, ε-polylysine, genipin, EDC, bacterial cellulose, pullulan, glycerin, nisin, and antibacterial peptide;

wherein, gelatin, ε-polylysine, genipin and EDC are first subjected to reaction to form a double-network polymer so as to obtain gel nanoparticles using gelatin as matrix and using gelatin and genipin to construct a double-network;

the bacterial cellulose is grinded to bacterial cellulose nanoparticles;

then the gel nanoparticles, the bacterial cellulose nanoparticles and pullulan, glycerin, nisin, antibacterial peptide are mixed and ultrasonically degassed to obtain a mixture to subject to coating and drying to form a film.

Further, the ratio among components and conditions for process are mentioned above. Such as, the mass ratio among the gel nanoparticles, the bacterial cellulose nanoparticles, pullulan, glycerin, nisin and the antibacterial peptide is 800-1000:50-100:5-10:1-5:0.05-0.2:0.05-0.2.

The mass ratio of a solution of ε-polylysine to a solution of gelatin is 2-50:1000.

The molar ratio of EDC to ε-polylysine is 1:1-5.

The prepared edible film has good mechanical property, antibacterial property and practical values of low-temperature stability and high-temperature dissolution.

The gelatin base edible film and the preparation method thereof provided by the embodiments of the present disclosure are further elaborated below in conjunction with specific embodiments.

Example 1

A preparation method of an edible gelatin base film, including the following steps:

a) preparing gel nanoparticles, specifically comprising:

a1) 10 g of gelatin in 1 L is dissolved in deionized water at room temperature and mixed uniformly under stirring to obtain a gelatin solution. A concentration of 1% ε-polylysine aqueous solution is added into the gelatin solution according to the mass ratio of the ε-polylysine solution to the gelatin solution of 2:1000, mixed uniformly under stirring and a first solution is obtained.

a2) 0.1 mL genipin solution with concentration of 1 mol/L is slowly added into the first solution under stirring, and a second solution is obtained by reacting at 30° C. for 4 h.

a3) According to the molar ratio of ε-polylysine to 1-(3-dimethylaminopropyl)-3-ethylcarbodiimide hydrochloride (EDC) of 3:1 in the reaction system, EDC is added into the second solution and mixed uniformly, then the system subjects to reaction for 0.5 h in an ice bath and 2 h at room temperature to obtain a double-network polymer crosslinked by amide bond and genipin.

a4) Excess EDC and genipin are removed by dialysis and 1 kg of the double-network polymer is pulverized to 0.5-1 um of gel nanoparticles using a homogenizer.

b) preparing bacterial cellulose nanoparticles 500 g of bacterial cellulose is grinded into bacterial cellulose nanoparticles with a diameter of 300 nm or less under the condition of liquid nitrogen freezing (−197° C.).

c) preparing gelatin base films 800 g of gel nanoparticles, 50 g of the bacterial cellulose nanoparticles, 5 g of pullulan, 1 g of glycerin, 0.05 g of nisin and 0.05 g antibacterial peptide are mixed together, and subjected to ultrasonically degassing for 1 h.

Then, the system is subjected to coating treatment with a coater at an ambient temperature of 10° C., and dried in an environment of 4° C., a wind speed of 10 L/min to obtain the gelatin base films.

Example 2

A preparation method of an edible gelatin base film, including the following steps:

a) preparing gel nanoparticles, specifically comprising:

a1) 30 g of gelatin in 1 L is dissolved in deionized water at room temperature and stirred uniformly to obtain a gelatin solution. A concentration of 2.5% ε-polylysine aqueous solution is added into the gelatin solution according to the mass ratio of the ε-polylysine solution to the gelatin solution of 25:1000, mixed uniformly under stirring and a first solution is obtained;

a2) 2.5 ml genipin solution with concentration of 1 mol/L is slowly added into the first solution under stirring, and a second solution is obtained by reacting at 30° C. for 7 h.

a3) According to the molar ratio of ε-polylysine to 1-(3-dimethylaminopropyl)-3-ethylcarbodiimide hydrochloride (EDC) of 3:1 in the reaction system, EDC is added into the second solution and mixed uniformly, then the system subjects to reaction for 0.5 h in an ice bath and 2 h at room temperature to obtain a double-network polymer crosslinked by amide bond and genipin.

a4) Excess EDC and genipin are removed by dialysis and 1 kg of the double-network polymer is pulverized to 0.5-1 um of gel nanoparticles using a homogenizer.

b) preparing bacterial cellulose nanoparticles 500 g of bacterial cellulose is grinded into bacterial cellulose nanoparticles with a diameter of 300 nm or less under the condition of liquid nitrogen freezing (−197° C.);

c) preparing gelatin base films 900 g of gel nanoparticles, 75 g of the bacterial cellulose nanoparticles, 8 g of pullulan, 3 g of glycerin, 0.1 g of nisin and 0.1 g antibacterial peptide are mixed together, and subjected to ultrasonically degassing for 1 h.

Then, the system is subjected to coating treatment with a coater at an ambient temperature of 8° C., and dried in an environment of 2° C., a wind speed of 20 L/min to obtain the gelatin base films.

Example 3

A preparation method of an edible gelatin base film, including the following steps:

a) preparing gel nanoparticles, specifically:

a1) 100 g of gelatin in 1 L is dissolved in deionized water at room temperature and stirred uniformly to obtain a gelatin solution. A concentration of 5% ε-polylysine aqueous solution is added into the gelatin solution according to the mass ratio of the ε-polylysine solution to the gelatin solution of 50:1000, mixed uniformly and and a first solution is obtained;

a2) 5 ml genipin solution with concentration of 1 mol/L is slowly added into the first solution under stirring, and a second solution is obtained by reacting at 40° C. for 15 h.

a3) According to the molar ratio of ε-polylysine to 1-(3-dimethylaminopropyl)-3-ethylcarbodiimide hydrochloride (EDC) of 3:1 in the reaction system, EDC is added into the second solution and mixed uniformly, then the system subjects to reaction for 0.5 h in an ice bath and 2 h at room temperature to obtain a double-network polymer crosslinked by amide bond and genipin.

a4) Excess EDC and genipin are removed by dialysis and 1 kg of the double-network polymer is pulverized to 0.5-1 um of gel nanoparticles using a homogenizer.

b) preparing bacterial cellulose nanoparticles 500 g of bacterial cellulose is grinded into bacterial cellulose nanoparticles with a diameter of 300 nm or less under the condition of liquid nitrogen freezing (−197° C.).

c) preparing gelatin base films 1000 g of gel nanoparticles, 100 g of the bacterial cellulose nanoparticles, 10 g of pullulan, 5 g of glycerin, 0.2 g of nisin and 0.2 g antibacterial peptide are mixed together, and subjected to ultrasonically degassing for 1 h.

Then, the system is subjected to coating treatment with a coater at an ambient temperature of 5° C., and dried it in an environment of 1° C., a wind speed of 50 L/min to obtain the gelatin base films.

Comparative Example 1

Same as Example 1, except that the temperature of coating with a coater is 20° C., and drying at room temperature.

Comparative Example 2

Same as Example 1, except that the EDC is not added.

Comparative Example 3

Same as Example 1, except that the genipin solution is not added.

Comparative Example 4

Same as Example 1, except that the bacterial cellulose nanoparticles are not added.

The corresponding performance tests are carried out on the edible gelatin base films obtained in the examples and the comparative examples, as follows:

1. The Mechanical Performance Tests of the Edible Gelatin Base Film

The edible gelatin base films obtained in Examples 1-3 and Comparative Examples 1-4 are subjected to performance tests such as elastic modulus, tensile strength and elongation at break, and the results are as follows:

| Number | Elastic Modulus/ MPa | Tensile Strength/ MPa | Elongation at Break/ % |
|---|---|---|---|
| Example 1 | 723.12 ± 21.00 | 42.12 ± 3.90 | 43.31 ± 4.32 |
| Example 2 | 812.43 ± 34.06 | 45.32 ± 5.19 | 52.23 ± 5.09 |
| Example 3 | 953.46 ± 48.07 | 53.09 ± 5.51 | 62.06 ± 8.17 |
| Comparative Example 1 | 551.09 ± 18.13 | 25.00 ± 6.01 | 20.12 ± 5.12 |
| Comparative Example 2 | 609.09 ± 11.23 | 23.19 ± 1.13 | 19.22 ± 4.62 |
| Comparative Example 3 | 523.01 ± 14.13 | 26.00 ± 7.31 | 11.12 ± 6.20 |
| Comparative Example 4 | 223.10 ± 13.12 | 12.00 ± 2.31 | 8.12 ± 1.23 |

From the above, the films have strong mechanical properties, which perform excellent in elastic modulus, tensile strength and elongation at break.

In the present disclosure, a rigid structure is formed in the core layer of the film through constructing a double-network structure filled with nano-scale bacterial celluloses, which influences the improvement of the film structure, forming a strong three-dimensional support structure layer, and significantly improving mechanical properties such as elastic modulus, tensile strength and elongation at break.

The mechanical properties of the comparative examples are significantly lower than the present disclosure.

2. The Temperature Stability Tests of the Edible Gelatin Base Film

The water solubility tests are carried out at different temperatures of Example 1, and the data is recorded as follows:

| | Temperature (° C.) | | | | | | |
|---|---|---|---|---|---|---|---|
| | 40 | 50 | 60 | 70 | 80 | 90 | 100 |
| Dissolution Time (s) | insoluble | insoluble | 30 | 20 | 10 | 5 | <1 |

The water solubility tests are carried out at different temperatures of Comparative Examples 1-4, and the data is recorded as follows:

| | Temperature (° C.) | | | | | | |
|---|---|---|---|---|---|---|---|
| Number | 40 | 50 | 60 | 70 Time (s) | 80 | 90 | 100 |
| Comparative Example 1 | 120 | 90 | 40 | 30 | 12 | 9 | <1 |
| Comparative Example 2 | 180 | 70 | 40 | 30 | 12 | 9 | <1 |
| Comparative Example 3 | 300 | 120 | 80 | 40 | 20 | 9 | <1 |
| Comparative Example 4 | 110 | 80 | 70 | 20 | 10 | 5 | <1 |

From the above, the edible film of the present disclosure is stable and insoluble below 50° C., which is stable during transportation, storage and other environments. When the water temperature is above 50° C., the dissolution time is shortened as the temperature increases, the gelatin base film is directly dissolved in water when the temperature is 100° C., which makes the edible film perform high practical value that it is suitable for seasoning package of hot water preparation, such as instant noodle seasoning package, salt bag, sugar bag, tea bag and so on.

3. The Antibacterial Performance Tests of the Edible Gelatin Base Films

ε-polylysine is a micromolecule polymer produced by polymerization of lysine, and has broad-spectrum antibacterial property because its molecular surface contains a large number of positively charged amino groups, which performs excellent antibacterial property against Gram-negative, *Escherichia coli*, Gram-positive and *Staphylococcus aureus*.

The strains used in the experiment are *Escherichia coli* and *Staphylococcus aureus*. The sample is cutting into a disc shape with the diameter of 15 mm. After the ultraviolet surface is sterilized, the antibacterial properties of the sample are tested by the plate count method, the results are shown in the following table:

| Number | the antibacterial ratio of *Escherichia coli* (%) | the antibacterial ratio of *Staphylococcus aureus* (%) |
|---|---|---|
| Example 1 | 93.98 | 91.64 |
| Example 2 | 95.01 | 96.01 |
| Example 3 | 100 | 100 |

According to the results, the edible films of the present disclosure perform high antibacterial ratio against *Escherichia coli* and *Staphylococcus aureus*.

The above are only the preferred embodiments of the present disclosure, and not intended to limit the present disclosure. Any modifications, equivalents, improvements, etc. within the spirit and scope of the present disclosure, should be included in the scope of the present disclosure.

What is claimed is:

1. A preparation method of a gelatin base edible film, including the following steps:
   a) preparing gel nanoparticles, comprising:
   a1) dissolving gelatin in water to obtain a gelatin solution, and adding a ε-polylysine solution into the gelatin solution to react and obtain a first solution;
   a2) adding a genipin solution into the first solution obtained in step a1) to react and obtain a second solution;
   a3) adding 1-(3-dimethylaminopropyl)-3-ethylcarbodiimide hydrochloride (EDC) into the second solution obtained in step a2) to mix, then reacting in an ice bath and then reacting at room temperature to obtain a double-network polymer;
   a4) removing excess EDC and genipin from the double-network polymer obtained in step a3), then pulverizing the double-network polymer to obtain the gel nanoparticles;
   b) preparing bacterial cellulose nanoparticles
   grinding a bacterial cellulose into bacterial cellulose nanoparticles under the condition of liquid nitrogen freezing;
   c) preparing the gelatin base edible film
   mixing pullulan, glycerin, nisin, antibacterial peptide, the gel nanoparticles obtained in step a) and the bacterial cellulose nanoparticles obtained in step b), ultrasonically degassing, then the resulted system being subjected to coating and drying to form a film to obtain the gelatin base edible film.

2. The preparation method according to claim 1, wherein, in step a1), the mass ratio of the ε-polylysine solution to the gelatin solution is 2-50:1000; in step a2), the genipin solution is added into the first solution obtained in the step a1) to make the concentration of genipin in the reaction system is 0.1-5 mmol/L; in step a3), the EDC is added in a molar ratio of EDC to ε-polylysine of 1:1-5.

3. The preparation method according to claim 1, wherein, in step a1), the mass fraction of the gelatin solution is 1-6%; the mass fraction of the ε-polylysine solution is 1-5%.

4. The preparation method according to claim 1, wherein, in step a2), the concentration of the genipin solution is 0.001-1 mol/L; the temperature of the reaction is 10-40° C., and the time of the reaction is 4-15 h.

5. The preparation method according to claim 1, wherein, in step a3), the time of the reaction in ice bath is 0.5-2 h; the time of the reaction at room temperature is 2-24 h.

6. The preparation method according to claim 1, wherein, in step a4), excess EDC and genipin are removed by dialysis.

7. The preparation method according to claim 1, wherein, in step a4), the diameter of the gel nanoparticles is 0.5-1 um; in step b), the diameter of the bacterial cellulose nanoparticles is 0-500 nm.

8. The preparation method according to claim 1, wherein, in step c), the mass ratio among the gel nanoparticles, the bacterial cellulose nanoparticles, pullulan, glycerin, nisin and the antibacterial peptide is 800-1000:50-100:5-10:1-5: 0.05-0.2:0.05-0.2.

9. The preparation method according to claim 1, wherein, in step c), the time of ultrasonically degassing is 1-2 h; the temperature of coating is 5-10° C.; drying is carried out under the condition of a temperature of 1-4° C. and a wind speed of 10-50 L/min.

* * * * *